(12) United States Patent
Liu (10) Patent No.: US 12,445,272 B2
(45) Date of Patent: Oct. 14, 2025

(54) FILE KEY STORAGE METHOD, SYSTEM AND APPARATUS, ELECTRONIC DEVICE, AND STORAGE MEDIUM

(71) Applicant: GUANGDONG OPPO MOBILE TELECOMMUNICATIONS CORP., LTD., Dongguan (CN)

(72) Inventor: Enfu Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 531 days.

(21) Appl. No.: 17/888,719

(22) Filed: Aug. 16, 2022

(65) Prior Publication Data

US 2022/0393861 A1    Dec. 8, 2022

Related U.S. Application Data

(63) Continuation of application No. PCT/CN2021/074821, filed on Feb. 2, 2021.

(30) Foreign Application Priority Data

Feb. 27, 2020  (CN) .......................... 202010124455.X (51) Int. Cl.
*H04L 9/08*         (2006.01)
*G06F 21/45*       (2013.01)

(52) U.S. Cl.
CPC ............ *H04L 9/0827* (2013.01); *G06F 21/45* (2013.01)

(58) Field of Classification Search
CPC ... H04L 9/0827; H04L 9/0861; H04L 9/0897; G06F 21/45; G06F 21/6218; G06F 21/602; G06F 21/62; G06F 2221/2107
See application file for complete search history.

(56) References Cited

U.S. PATENT DOCUMENTS

| 7,957,535 B2 * | 6/2011 | Ochi ................... H04N 21/4334 705/53 |
| 10,291,395 B1 | 5/2019 | Nonov et al. |
| 2017/0041296 A1 * | 2/2017 | Ford ....................... G06F 21/64 |

(Continued)

FOREIGN PATENT DOCUMENTS

| CN | 101091184 A | | 12/2007 |
| CN | 101784045 A | * | 7/2010 |
| CN | 104424028 A | * | 3/2015 |

(Continued)

OTHER PUBLICATIONS

Extended European Search Report dated Jun. 19, 2023 received in European Patent Application No. EP21760336.4.

(Continued)

*Primary Examiner* — Han Yang
(74) *Attorney, Agent, or Firm* — Sheppard, Mullin, Richter &Hampton LLP (57) ABSTRACT

The present disclosure discloses a file key storage method, system and apparatus, an electronic device, and a storage medium. A terminal generates, after receiving an encryption request for a target file, a key for the target file based on the encryption request, and transmits a key storage request to an external safety device to request the external safety device to store a correspondence between an identifier of the target file and the key.

17 Claims, 5 Drawing Sheets

(56) References Cited

U.S. PATENT DOCUMENTS

2019/0057043 A1\* 2/2019 Barzik ................ G06F 21/6218
2019/0260575 A1\* 8/2019 Nenov ................ H04L 63/0428

FOREIGN PATENT DOCUMENTS

CN 107528917 A 12/2017
CN 109635581 A 4/2019
CN 109639419 A 4/2019

OTHER PUBLICATIONS

International Search Report and Written Opinion dated Apr. 13, 2021 in International Application No. PCT/CN2021/074821. English translation attached.
The First Office Action from corresponding Chinese Application No. 202010124455.X dated Aug. 1, 2024.

\* cited by examiner

FILE KEY STORAGE METHOD, SYSTEM AND APPARATUS, ELECTRONIC DEVICE, AND STORAGE MEDIUM

CROSS-REFERENCE TO RELATED APPLICATION

The present application is a continuation of International Patent Application No. PCT/CN2021/074821, filed on Feb. 2, 2021, which claims priority to Chinese Patent Application No. 202010124455.X filed on Feb. 27, 2020, the entire disclosures of which are hereby incorporated by reference in their entireties.

TECHNICAL FIELD

The present disclosure relates to the field of computer technologies, and more particularly, to a file key storage method, system and apparatus, an electronic device, and a storage medium.

BACKGROUND

With the advancement of science and technology, terminal devices are becoming more and more popular. In the process of using a terminal device, e.g., a smart phone, many related files will be stored in the terminal device, including those actively uploaded by the user, and those automatically generated during the use of applications.

Taking the smart phone as an example, generally, some files with high privacy (hereinafter referred to as private files) will be encrypted and stored in the smartphone. Therefore, all encryption schemes for private files are based on the operating system of the smart phone. However, some operating systems used by current smart phones are naturally open, for example, the Android system, the code logic and schemes of which are easy to be known.

Therefore, when the system-level authority of the terminal device is stolen, it is difficult to guarantee the safety of the key stored in the operating system of the terminal device.

SUMMARY

A method is provided. The file key storage method is performed by a terminal device and includes: receiving an encryption request for a target file; generating a key for the target file based on the encryption request; and transmitting a key storage request to an external safety device. The key storage request is configured to request the external safety device to store a correspondence between an identifier of the target file and the key.

A file decryption method is provided. The file decryption method is performed by a terminal device and includes: receiving a decryption request for a target file; transmitting a key retrieval request to an external safety device based on the decryption request, the key retrieval request carrying an identifier of the target file and being configured to request a key corresponding to the identifier of the target file from the external safety device; and receiving the key returned by the external safety device, and decrypting the target file based on the key.

An electronic device is provided. The electronic device includes: a memory having a computer program stored thereon; and a processor. The computer program, when executed by the processor, causes electronic device to: receive an encryption request for a target file; generate a key for the target file based on the encryption request; and transmit a key storage request to an external safety device, the key storage request being configured to request the external safety device to store a correspondence between an identifier of the target file and the key.

BRIEF DESCRIPTION OF DRAWINGS

In order to clearly explain technical solutions according to embodiments of the present disclosure or in the related art, drawings used in the description of the embodiments of present disclosure or the related art are briefly described below. Apparently, the drawings as described below are merely some embodiments of the present disclosure. Based on these drawings, other drawings can be obtained by those skilled in the art without creative effort.

DESCRIPTION OF EMBODIMENTS

In order to make the objects, technical solutions, and advantages of the present disclosure more apparent, the present disclosure will be described in detail with reference to the accompanying drawings and embodiments. It should be understood that the embodiments described here are only used to explain, rather than limit, the present disclosure.

Figure 1:
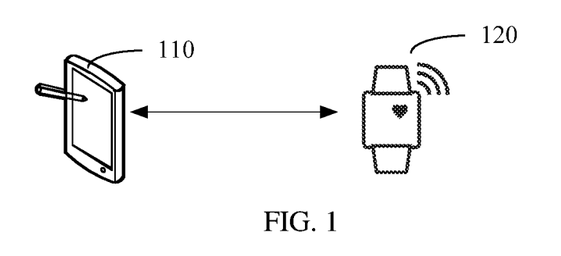
FIG. 1 is a diagram showing an application environment of a file key storage method according to some embodiments.

FIG. 1 is a diagram showing an application environment of a file key storage method according to some embodiments. As illustrated in FIG. 1, the application environment includes a terminal 110 and an external safety device 120. The terminal 110 includes, but is not limited to, electronic devices such as a smartphone, a personal computer, a laptop computer, a desktop computer, a media player, a smart television, a tablet computer, and the like. The external safety device 120 may be a portable wearable device, e.g., a smart watch, a smart necklace, a smart helmet, or the like. Here, the external safety device can be connected to the terminal by means of Bluetooth, infrared, Wireless Fidelity (WiFi), Universal Serial Bus (USB) interface, and other manners.

Figure 2:
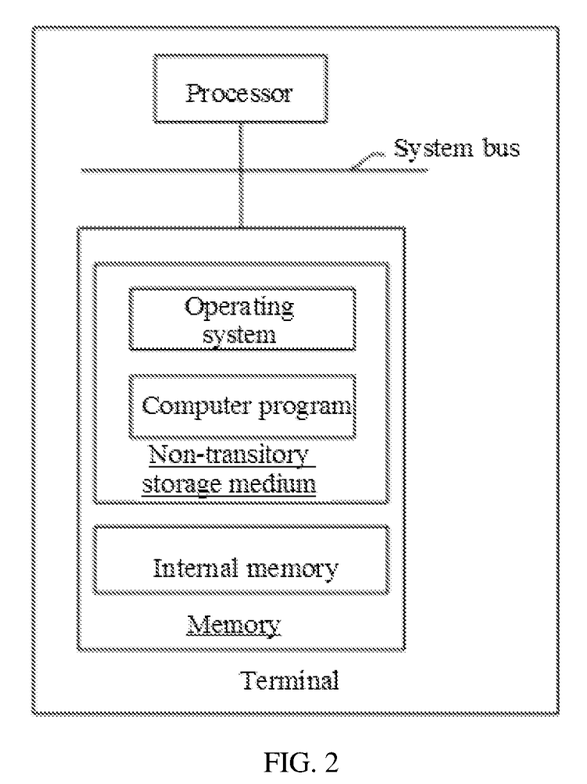
FIG. 2 is a schematic diagram showing an internal structure of a terminal according to some embodiments.

Here, reference may be made to FIG. 2 for a schematic diagram of an internal structure of the terminal 110. As illustrated in FIG. 2 of the internal structure of the terminal 110, the terminal includes a processor and a memory that are connected to each other via a system bus. The processor is configured to provide computing and control capabilities to support operations of the entire terminal. The memory may include a non-transitory storage medium and an internal memory. The non-transitory storage medium has an operating system and a computer program stored thereon. The computer program is executable by the processor to implement a file key storage method as provided in any of the following embodiments. The internal memory is configured to provide a cached running environment for the operating system and the computer program in the non-transitory storage medium.

Technical solutions of the present disclosure and how the technical solutions of the present disclosure solve the above-mentioned technical problems will be described in detail below with embodiments in conjunction with the accompanying drawings. The following specific embodiments may be combined with each other, and same or similar concepts or processes may be omitted in some embodiments. It should be noted that for the file key storage methods provided by the present disclosure, as illustrated in FIG. 3 to FIG. 6, an executive subject thereof is a terminal. Alternatively, an executive subject of each of the methods shown in FIG. 3 to FIG. 6 may be a file key storage apparatus. The apparatus may be implemented as part or a whole of the terminal by means of software, hardware, or a combination thereof.

Figure 3:
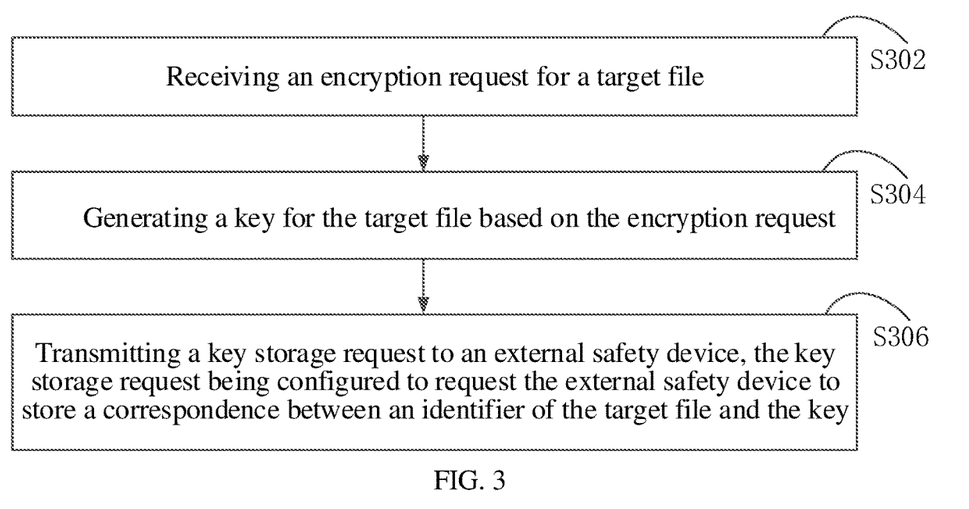
FIG. 3 is a flowchart illustrating a file key storage method according to some embodiments.

FIG. 3 is a flowchart illustrating a file key storage method according to some embodiments. The file key storage method according to the embodiments is described with the method running in the terminal running in FIG. 1 as an example. As illustrated in FIG. 3, the file key storage method includes actions at blocks 302 to 306.

At block 302, an encryption request for a target file is received.

The target file represents a file to be encrypted in a current terminal. For example, in practical applications, when a user stores some relatively private files, the user may encrypt these private files to ensure privacy. Here, the file to be encrypted may be a picture, e.g., an encrypted pattern of a payment application, including an image for face unlocking or payment of the user, etc.; a document, e.g., a document edited on the terminal or uploaded to the terminal by the user actively; or other types of files, e.g., an account number and a password of an application, an unlock password, etc. The embodiments do not limit a type, a quantity, etc., of the target file.

The encryption request for the target file represents a request triggered when a current user needs to encrypt the target file. For example, the user triggers, on a display screen of the terminal, an encryption request for the target file, and the terminal receives the encryption request for the target file. Here, the user may trigger the encryption request for the target file by manners such as voice, touch, an external input device, etc., which is not limited in the embodiments.

In some scenarios, the encryption request may carry an encryption manner, e.g., password encryption, verification code encryption, pattern encryption, etc.

At block 304, a key for the target file is generated based on the encryption request.

After receiving the encryption request, the terminal encrypts the target file and generates the key for the target file. The key refers to secret information used to complete cryptographic applications such as encryption, decryption, and integrity verification.

Here, a way for the terminal to generate the key for the target file is not limited. For example, after receiving the encryption request, the terminal may encrypt the target file by a built-in encryption algorithm, and generate the key for the target file after the target file is encrypted. Of course, the encryption algorithm may be a Data Encryption Algorithm (DEA), a Data Encryption Standard (DES), a hash algorithm, or the like, which is not limited in the embodiments.

At block 306, a key storage request is transmitted to an external safety device. The key storage request is configured to request the external safety device to store a correspondence between an identifier of the target file and the key.

The external safety device refers to an external device configured to store the key for the target file. For example, the external device may be a device connected to the terminal via a USB interface, e.g., a Ukey; or a device connected to the terminal in a wireless way, e.g., a wearable device that may be connected to the terminal by Bluetooth, WiFi, or the like. The type of the external safety device is not limited.

Based on the key for the target file generated by the terminal, the terminal transmits a correspondence between the target file and the key to the external safety device for storage. That is, the terminal transmits the key storage request to the external safety device. The key storage request is configured to request the external safety device to store the correspondence between the identifier of the target file and the key. Here, the identifier of the target file may be in a form of words, numbers, letters, or a combination thereof, and is not limited to any of these example forms.

With the file key storage method according to the embodiments, after receiving the encryption request for the target file, the terminal generates the key for the target file based on the encryption request, and transmits the key storage request to the external safety device to request the external safety device to store the correspondence between the identifier of the target file and the key. In the embodiments, the terminal stores the key in the external safety device after generating the key for the target file, which is equivalent to using independent storage hardware for the key and storing the key at hardware-level safety isolation. In this manner, the key is not likely to be stolen, which greatly improves storage safety for the key. In addition, what stored in the external safety device is the correspondence between the identifier of the target file and the key, and the key for the target file can be accurately retrieved and positioned through the correspondence.

For the above external safety device, a process of transmitting, by the terminal, the key storage request to the external safety device and storing, by the external safety device, the key is explained by taking the external safety device being a wearable device as an example.

In some embodiments, the external safety device is a wearable device. The transmitting the key storage request to the external safety device includes transmitting the key storage request to the wearable device. Optionally, the wearable device includes a Real-Time Operating System (RTOS), and the transmitting the key storage request to the wearable device includes transmitting the key storage request to the wearable device, the key storage request being configured to request the wearable device to store the correspondence between the identifier of the target file and the key in the RTOS.

In some embodiments, when the external safety device is the wearable device, the terminal establishes a connection with the wearable device in advance, and then transmits the key storage request to the wearable device to request the wearable device to store the correspondence between the identifier of the target file and the key for the target file.

In a scenario, it is assumed that the wearable device includes the RTOS. The RTOS, which is an abbreviation for a Real-Time Operating System, may run and manage system resources in an order and provide a consistent basis for developing applications. Compared with a usual operating system, the RTOS has the most distinctive characteristic of "real time capability". Therefore, when a task needs to be executed, the RTOS may execute the task immediately (within a short time) without long delays. Such a characteristic ensures timely execution of each task. Based on such a characteristic of the RTOS, in a case where the wearable device includes the RTOS, the wearable device may store the correspondence between the identifier of the target file and the key in the RTOS after the terminal transmits the key storage request to the wearable device. In this manner, a file key storage process can be completed quickly in real time during an actual application of the file key storage method provided by the present disclosure.

In another scenario, it is assumed that the wearable device includes two operating systems, one of which has higher power consumption than the other operating system. For example, the operating system having higher power consumption is a commonly used operating system of the wearable device, and the operating system having lower power consumption is a backup operating system of the wearable device. For this scenario, the process of transmitting, by the terminal, the key storage request to the external safety device and storing, by the external safety device, the key is explained with reference to some embodiments.

In some embodiments, the wearable device includes a first operating system and a second operating system. A storage space of the first operating system is independent of a storage space of the second operating system. The transmitting the key storage request to the wearable device includes transmitting the key storage request to the first operating system of the wearable device, the key storage request being used to instruct the first operating system to store the correspondence between the identifier of the target file and the key in the second operating system. Optionally, power consumption of the first operating system is greater than power consumption of the second operating system. Optionally, different chips are applied in the first operating system and the second operating system.

In the embodiments, the wearable device includes the first operating system and the second operating system, the storage space of the first operating system is independent of that of the second operating system, and in the wearable device, the power consumption of the first operating system is greater than that of the second operating system. Power consumption of the wearable device can be reduced by using the second operating system having lower power consumption to store the correspondence between the identifier of the target file and the key. Moreover, different chips are applied in the first operating system and the second operating system. Therefore, even in the wearable device, chip-level physical isolation is adopted to improve safety of the correspondence between the identifier of the target file and the key. In this manner, when the terminal device transmits the key storage request to the wearable device, the key storage request reaches the first operating system first. After receiving the key storage request, the first operating system stores the correspondence between the identifier of the target file and the key in the second operating system. Since the storage spaces of the two operating systems are independent of each other and the second operating system is not a commonly used system of the wearable device, storing the key in the second operating system can ensure the storage safety for the key.

In some embodiments, the first operating system is an Android system and the second operating system is the RTOS. Optionally, the wearable device is a smart watch.

Figure 4:
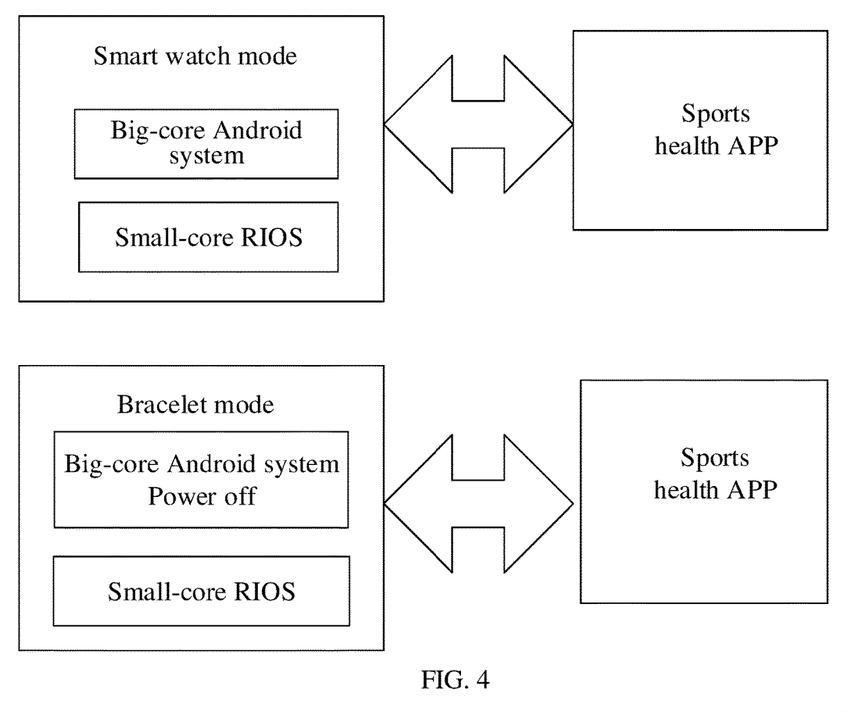
FIG. 4 is a schematic diagram showing dual systems of a smart watch according to some embodiments.

Take the smart watch including the Android system and the RTOS as an example for illustration. That is, the smart watch is a dual-system and dual-mode smart watch, as shown in FIG. 4, showing a schematic diagram of a same sports application (APP) with respect to two operating systems. In the smart watch, a big core uses the Android system, a small core uses the RTOS, and the two adopts different chips and have mutually independent storage spaces. The user is capable of freely switching between the Android system and the RTOS. The Android system provides comprehensive functions while the RTOS provides low-power-consumption ultra-long battery life and safety reinforcement capability. The power consumption of the Android system is greater than the power consumption of the RTOS.

When the smart watch uses the Android system having a big core, the Android system corresponds to a normal mode due to the comprehensive functions of the Android system. When the smart watch uses the RTOS having a small core, the RTOS corresponds to a bracelet mode of the smart watch since the RTOS is a mode switched in response to the low-power-consumption ultra-long battery life.

For example, after generating the key for the target file, the terminal transmits the key storage request, which carries the correspondence between the identifier of the target file and the key, to the big-core Android system of the smart watch. After receiving the key storage request, the big-core Android system of the smart watch forwards the key storage request to the small-core RTOS of the smart watch, i.e., storing the correspondence between the identifier of the target file and the key. In this manner, the key is stored at hardware-level safety isolation by using independent storage hardware, and is therefore not likely to be stolen, which greatly improves the storage safety for the key.

In the embodiments, the terminal stores the key for the target file in the bracelet mode of the smart watch. When the target file needs to be decrypted, the terminal is connected to the bracelet, and the target file can be opened by the key stored in the bracelet mode. Such a manner ensures safety of the target file in use.

Figure 5:
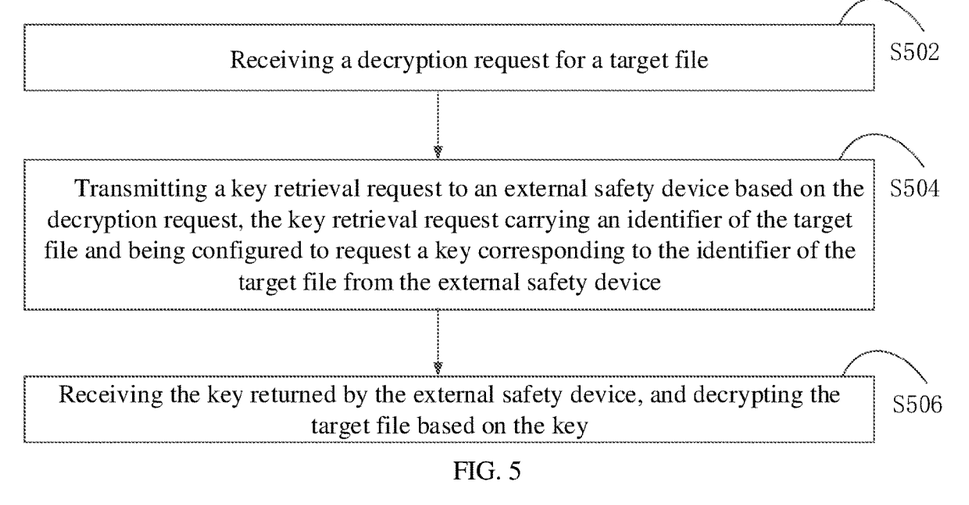
FIG. 5 is a flowchart illustrating a file key storage method according to some other embodiments.

In practical applications, in addition to the process of encrypting the target file and then storing the key involved in the above embodiments, when the target file needs to be used, the key needs to be retrieved to open the target file. Therefore, a decryption process of the target file is explained with reference to some embodiments. As illustrated in FIG. 5, in some embodiments, the method includes actions at blocks S502 to S506, subsequent to transmitting the key storage request to the external safety device.

At block S502, a decryption request for the target file is received.

For the target file, reference may be made to the description at block 302, and details thereof will be omitted here. Here, the decryption request refers to a request triggered when the user needs to decrypt the target file. For example, the user may trigger the decryption request on the display screen of the terminal.

At block S504, a key retrieval request is transmitted to the external safety device based on the decryption request. The key retrieval request carries the identifier of the target file and is configured to request the key corresponding to the identifier of the target file from the external safety device.

Similarly, for the external safety device, reference may be made to the description in the above embodiments, and details thereof will be omitted here.

In this action, after receiving the decryption request, the terminal transmits the key retrieval request to the external safety device. To accurately retrieve the key for the target file, the key retrieval request transmitted by the terminal to the external safety device carries the identifier of the target file. After receiving the key retrieval request, the external safety device can position the key corresponding to the target file based on the identifier of the target file, and return the key to the terminal.

At block S506, the key returned by the external safety device is received, and the target file is decrypted based on the key.

After the terminal receives the key returned by the external safety device, the terminal can decrypt the target file based on the key. Since the key is stored on independent storage hardware at hardware-level safety isolation, the storage has high safety, and the safety of the target file can be greatly ensured in a process of decrypting the target file by using the key and applying the target file.

In some embodiments, it is assumed the external safety device is the wearable device including the RTOS. On this basis, in some embodiments, the transmitting, by the terminal, the key retrieval request to the external safety device includes transmitting the key retrieval request to the wearable device, the key retrieval request being configured to request the key corresponding to the identifier of the target file from the RTOS of the wearable device.

When the external safety device is the wearable device, the terminal has already pre-stored a key for a file in the wearable device. In a case where the wearable device includes the RTOS, the key for the file is stored in the RTOS of the wearable device. Therefore, transmitting, by the terminal, the key retrieval request to the external safety device means requesting the key for the file from the RTOS of the wearable device. Based on the introduction of characteristics of the RTOS in the above embodiments, the RTOS of the wearable device can make a response instantly after receiving the key retrieval request, and transmit the key corresponding to the identifier of the target file to the terminal. Therefore, by requesting the key for the file from the RTOS of the wearable device, the key for the file can be obtained quickly in real time to complete a subsequent file decryption process.

In some other embodiments, the external safety device is a wearable device including a first operating system and a second operating system, a storage space of the first operating system is independent of a storage space of the second operating system, and the transmitting the key retrieval request to the external safety device includes transmitting the key retrieval request to the first operating system of the wearable device, the key retrieval request being used to instruct the first operating system to retrieve the key corresponding to the identifier of the target file from the second operating system.

In the embodiments, for the first operating system and the second operating system of the wearable device, reference can be made to the introduction in the above embodiments, and details thereof will be omitted here.

In a case where the wearable device includes the first operating system and the second operating system, the terminal pre-stores the key for the file in the second operating system of the wearable device. Therefore, transmitting, by the terminal, the key retrieval request to the external safety device means requesting the key for the file from the second operating system of the wearable device.

Optionally, the first operating system and the second operating system adopt different chips, and in the wearable device, the power consumption of the first operating system is greater than the power consumption of the second operating system. On this basis, the terminal pre-stores the key for the file in the second operating system, which has lower power consumption, of the wearable device. Using the second operating system having lower power consumption to store the correspondence between the identifier of the target file and the key can reduce the power consumption of the wearable device. Moreover, since the first operating system and the second operating system adopt different chips, the safety of the key for the target file is improved through chip-level physical isolation, even in the wearable device.

For example, the wearable device is the smart watch, the first operating system is the Android system, and the second operating system is the RTOS. After the terminal device transmits the key retrieval request to the wearable device, the key retrieval request reaches the first operating system first. After receiving the key retrieval request, the first operating system continues to request the key corresponding to the identifier of the target file from the second operating system. That is, the terminal device transmits the key retrieval request to the Android system first, and the Android system transmits the key retrieval request to the RTOS after receiving the key retrieval request. In this manner, the RTOS makes a response instantly after receiving the key retrieval request, to transmit, to the Android system, the key corresponding to the identifier of the target file to allow the Android system to transmit the key to the terminal, achieving a quick and real-time access to the key for the file and completing decryption of the target file.

Figure 6:
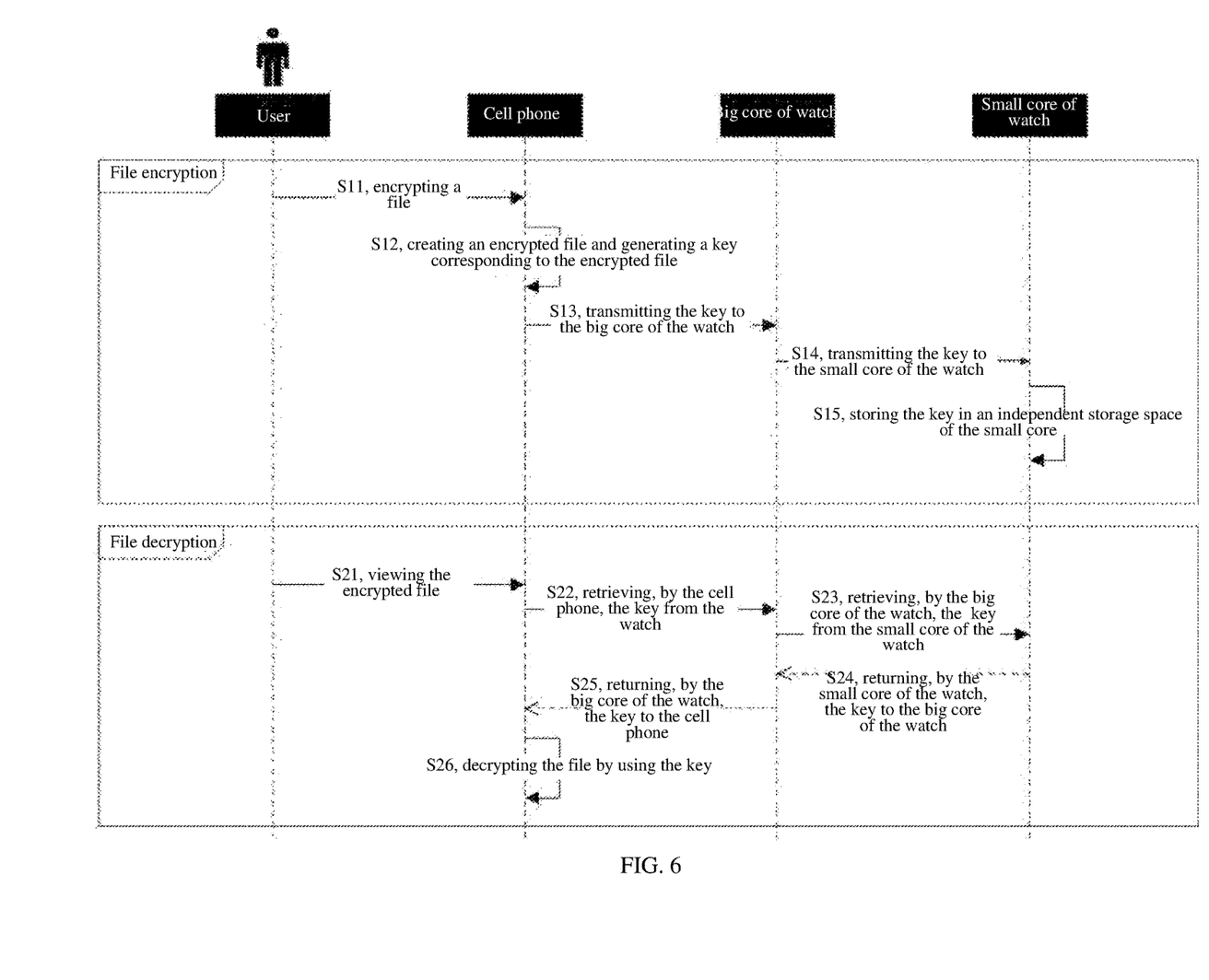
FIG. 6 is a schematic diagram showing file encryption and decryption according to some embodiments.

As illustrated in FIG. 6, some embodiments of storing a key for an encrypted file and retrieving the key for the encrypted file are provided by taking the wearable device being the dual-system and dual-mode smart watch and the terminal being a cell phone as an example. The embodiments include file encryption step at blocks S11 to S15 and file decryption steps at blocks S21 to S26.

File Encryption Steps:
  At S11, a user operates on the cell phone to encrypt a file.
  At S12, the cell phone creates an encrypted file and generates a key corresponding to the encrypted file.
  At S13, the cell phone transmits the key to a big core of the smart watch.
  At S14, the big core of the smart watch transmits the key to a small core of the smart watch.
  At S15, the small core of the smart watch stores the key in an independent storage space of the small core.

File Decryption Steps:
  At S21, the encrypted file is viewed.
  At S22, the cell phone retrieves the key from the smart watch.
  At S23, the big core of the smart watch retrieves the key from the small core of the smart watch.
  At S24, the small core of the smart watch returns the key to the big core of the smart watch.
  At S25, the big core of the smart watch returns the key to the cell phone.
  At S26, the cell phone decrypts the file by using the key.

The embodiments provide a joint file encryption processing strategy for a cell phone and a smart watch that has a dual-core and dual-system architecture. Since the key for the file is stored in the small core of the smart watch, storage safety of the key for the file can be improved for a reason that the small core of the smart watch, which adopts the RTOS, has an independent storage space, and it is difficult for an intruder to obtain the key for the file. Therefore, safety of files in the cell phone can be effectively improved.

It should be understood that although steps in each of the flowcharts illustrated in FIG. 3 to FIG. 6 are shown in a sequence indicated by the arrow, these steps are not necessarily executed in the sequence indicated by the arrow. Unless explicitly stated herein, the sequence for the execution of these steps is not strictly limited, and these steps may be performed in other sequences. In addition, at least a part of the steps in each of FIG. 3 to FIG. 6 may include a plurality of sub-steps or a plurality of stages. These sub-steps or stages are not necessarily executed and completed at the same moment of time, but may be executed at different moments of time. These sub-steps or stages are also not necessarily executed sequentially one by one, but may be executed in turn or alternately with other steps, or at least a part of sub-steps or stages of other steps.

In addition, some embodiments of the present disclosure further provide a file key storage system. Referring to FIG. 1, the system includes: a terminal and an external safety device. The terminal is configured to receive an encryption request for a target file, generate a key for the target file based on the encryption request, and transmit a key storage request to the external safety device. The external safety device is configured to receive the key storage request transmitted from the terminal, and store a correspondence between an identifier of the target file and the key based on the key storage request.

In some embodiments, the external safety device is a wearable device.

In some embodiments, the wearable device includes an RTOS. The wearable device is configured to store the correspondence between the identifier of the target file and the key in the RTOS.

In some embodiments, the wearable device includes a first operating system and a second operating system. A storage space of the first operating system is independent of a storage space of the second operating system. The first operating system of the wearable device is configured to receive the key storage request, and store, based on the key storage request, the correspondence between the identifier of the target file and the key in the second operating system.

In some embodiments, power consumption of the first operating system is greater than power consumption of the second operating system.

In some embodiments, the first operating system and the second operating system adopt different chips.

In some embodiments, the first operating system is an Android system, and the second operating system is the RTOS.

In some embodiments, the wearable device is a smart watch.

In some embodiments, the terminal is further configured to: receive a decryption request for a target file; transmit a key retrieval request to the external safety device based on the decryption request; and receive the key returned by the external safety device, and decrypt the target file based on the key. The external safety device is further configured to receive the key retrieval request transmitted from the terminal, and transmit, based on the key retrieval request, the key corresponding to the identifier of the target file to the terminal.

The implementation principles and technical effects of the file key storage system according to the above embodiments are similar to those of the embodiments of the file key storage method, and details thereof will be omitted here.

Figure 7:
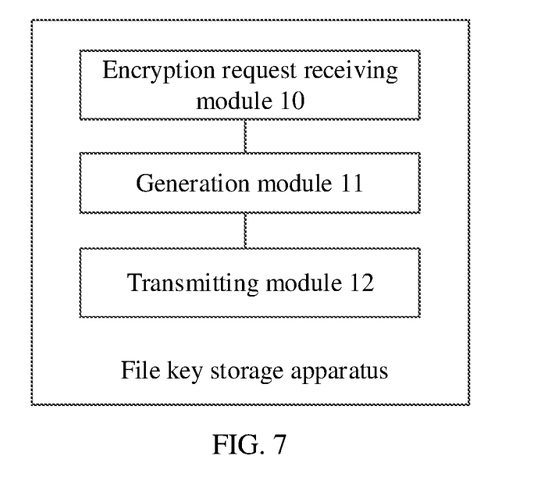
FIG. 7 is a block diagram showing a structure of a file key storage apparatus according to some embodiments.

In addition, a virtual apparatus corresponding to the above file key storage method is also provided. In some embodiments, FIG. 7 is a block diagram showing a structure of a file key storage apparatus according to some embodiments. As illustrated in FIG. 7, the apparatus includes: an encryption request receiving module 10, a generation module 11, and a transmitting module 12.

Here, the encryption request receiving module 10 is configured to receive an encryption request for a target file.

The generation module 11 is configured to generate a key for the target file based on the encryption request.

The transmitting module 12 is configured to transmit a key storage request to an external safety device. The key storage request is configured to request the external safety device to store a correspondence between an identifier of the target file and the key.

In some embodiments, the transmitting module 12 is specifically configured to transmit the key storage request to a wearable device.

In some embodiments, the transmitting module 12 is further specifically configured to transmit the key storage request to a wearable device. The key storage request is configured to request the wearable device to store the correspondence between the identifier of the target file and the key in the RTOS.

In some embodiments, the transmitting module 12 is further specifically configured to transmit the key storage request to the first operating system of the wearable device. The key storage request is configured to instruct the first operating system to store the correspondence between the identifier of the target file and the key in the second operating system.

In some embodiments, power consumption of the first operating system is greater than power consumption of the second operating system.

In some embodiments, the first operating system and the second operating system adopt different chips.

In some embodiments, the first operating system is an Android system, and the second operating system is the RTOS.

In some embodiments, the wearable device is a smart watch.

Figure 8:
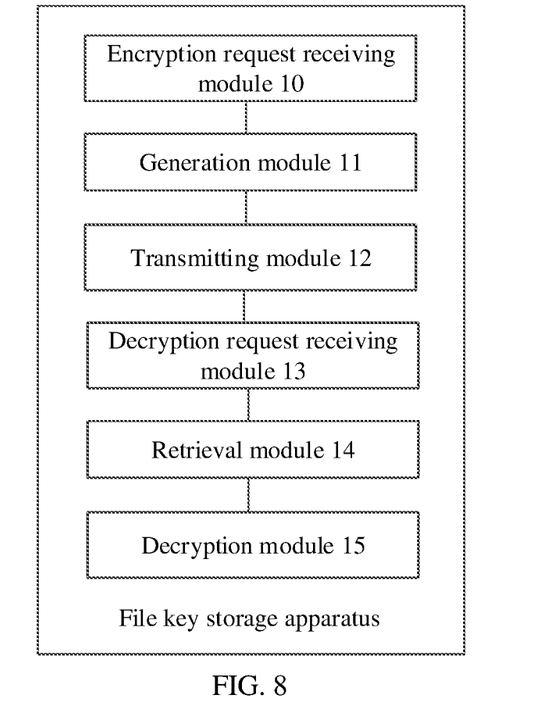
FIG. 8 is a block diagram showing a structure of a file key storage apparatus according to some embodiments.

In some embodiments, a file key storage apparatus is provided. As illustrated in FIG. 8, the apparatus includes a decryption request receiving module 13, a retrieval module 14, and a decryption module 15.

The decryption request receiving module 13 is configured to receive a decryption request for a target file.

The retrieval module 14 is configured to transmit a key retrieval request to an external safety device based on the decryption request. The key retrieval request carries an identifier of the target file and is configured to request a key corresponding to the identifier of the target file from the external safety device.

The decryption module 15 is configured to receive the key returned by the external safety device, and decrypt the target file based on the key.

In some embodiments, the retrieval module 14 is specifically configured to transmit the key retrieval request to the wearable device. The key retrieval request is configured to request the key corresponding to the identifier of the target file from the RTOS of the wearable device.

In some embodiments, the retrieval module 14 is further specifically configured to transmit the key retrieval request to the first operating system of the wearable device. The key retrieval request is configured to instruct the first operating system to retrieve the key corresponding to the identifier of the target file from the second operating system.

The implementation principles and technical effects of all the file key storage apparatuses according to the above embodiments are similar to those of the embodiments of the file key storage method, and details thereof will be omitted here.

The division of the file key storage apparatus into various modules is for illustration only. In some other embodiments, the file key storage apparatus may be divided into different modules as required to complete all or part of the functions of the file key storage.

For specific limitations of the file key storage apparatus, reference may be made to limitations of the file key storage method, which will not be repeated here. Each module in the file key storage apparatus may be implemented in whole or in part by software, hardware, or a combination thereof. The above modules can be embedded in the form of hardware in or independent of the processor in a computer device, or stored in the form of software in the memory in the computer device, such that the processor can invoke and execute operations corresponding to the above modules.

In some embodiments, an electronic device is provided. For a schematic diagram of an internal structure of the electronic device, reference may be made to the diagram of the internal structure of the terminal illustrated in FIG. 2. The electronic device includes a processor and a memory that are connected via a system bus. Here, the processor is configured to provide computing and control capabilities to support the operation of the entire electronic device. The memory includes a non-transitory storage medium and an internal memory. The non-transitory storage medium has an operating system and a computer program stored thereon. The computer program, when executed by the processor, implements the file key storage method according to any of the following embodiments. The internal memory provides a cached operating environment for the operating system and the computer program in the non-transitory storage medium. The electronic device may be any terminal device such as a cell phone, a tablet computer, a Personal Digital Assistant (PDA), a Point of Sales (POS), an in-vehicle computer, a wearable device, etc.

Each module in the file key storage apparatus according to the embodiments of the present disclosure may be implemented in the form of a computer program. The computer program can run on a terminal or a server. A program module constituted by the computer program can be stored in a memory of the electronic device. The computer program, when executed by the processor, implements the steps of the method described in the embodiments of the present disclosure.

The embodiments of the present disclosure further provide a computer-readable storage medium, such as one or more non-transitory computer-readable storage media including computer-executable instructions. When executed by one or more processors, the computer-executable instructions cause the one or more processors to perform steps of the file key storage method.

Further provided is a computer program product including instructions, which, when executed on a computer, causes the computer to perform the file key storage method.

Any reference to memory, storage, database, or other media as used herein may include a non-transitory and/or a transitory memory. The non-transitory memory may include a Read Only Memory (ROM), a Programmable ROM (PROM), an Electrically Programmable ROM (EPROM), an Electrically Erasable Programmable ROM (EEPROM), or a flash memory. The transitory memory may include a Random Access Memory (RAM) that acts as an external cache memory. By way of illustration, rather than limitation, an RAM is available in various forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiments illustrate merely some implementations of the present disclosure. Although description of the above embodiments is specific and detailed, the description should not be construed as limitations on the scope of the present disclosure. It should be pointed out that, various modifications and improvements can be made by those skilled in the art without departing from the concept of the present disclosure, and the protection scope of the present disclosure is as defined by the claims as attached.

What is claimed is:

1. A file key storage method, performed by a terminal, the method comprising:
　receiving an encryption request for a target file;
　generating a key for the target file based on the encryption request; and
　transmitting a key storage request to an external safety device, wherein the key storage request is configured to request the external safety device to store a correspondence between an identifier of the target file and the key,
　wherein the external safety device is a wearable device comprising a first operating system and a second operating system, a storage space of the first operating system being independent of a storage space of the second operating system; and
　wherein said transmitting the key storage request to the external safety device comprises:
　transmitting the key storage request to the first operating system of the wearable device, wherein the key storage request is configured to instruct the first operating system to store the correspondence between the identifier of the target file and the key in the second operating system.

2. The file key storage method according to claim 1, wherein the second operating system is a Real-Time Operating System (RTOS).

3. The file key storage method according to claim 1, wherein power consumption of the first operating system is greater than power consumption of the second operating system.

4. The file key storage method according to claim 1, comprising, subsequent to said transmitting the key storage request to the external safety device:
　receiving a decryption request for the target file;
　transmitting a key retrieval request to the external safety device based on the decryption request, wherein the key retrieval request carries the identifier of the target file and is configured to request the key corresponding to the identifier of the target file from the external safety device; and
　receiving the key returned by the external safety device, and decrypting the target file based on the key.

5. The file key storage method according to claim 1, wherein the external safety device is a smart watch, the first operating system is an Android system and the second operating system is a Real-Time Operating System (RTOS),
　wherein said transmitting the key storage request to the external safety device comprises:
　transmitting the key storage request to the Android system, the key storage request being forwarded by the Android system to the RTOS.

6. The file key storage method according to claim 1, wherein the target file is a picture, a document, an account number and a password of an application, or an unlock password.

7. The file key storage method according to claim 1, wherein the encryption request carries an encryption manner, wherein the encryption manner comprises password encryption, verification code encryption, or pattern encryption.

8. The file key storage method according to claim 1, wherein the external safety device is a device connected to the terminal via a USB interface or in a wireless way.

9. A file decryption method, performed by a terminal, the method comprising:
receiving a decryption request for a target file;
transmitting a key retrieval request to an external safety device based on the decryption request, wherein the key retrieval request carries an identifier of the target file and is configured to request a key corresponding to the identifier of the target file from the external safety device; and
receiving the key returned by the external safety device, and decrypting the target file based on the key,
wherein the external safety device is a wearable device comprising a first operating system and a second operating system, a storage space of the first operating system being independent of a storage space of the second operating system; and
wherein said transmitting the key retrieval request to the external safety device comprises:
transmitting the key retrieval request to the first operating system of the wearable device, wherein the key retrieval request is configured to instruct the first operating system to retrieve the key corresponding to the identifier of the target file from the second operating system.

10. The file decryption method according to claim 9, wherein the second operating system is a Real-Time Operating System (RTOS).

11. The file decryption method according to claim 9, wherein said transmitting the key retrieval request to the external safety device comprises:
transmitting the key retrieval request to the first operating system; the key retrieval request being transmitted by the first operating system to the second operating system, the second operating system transmitting the key corresponding to the identifier of the target file to the first operating system.

12. An electronic device, comprising:
a memory having a computer program stored thereon; and
a processor,
wherein the computer program, when executed by the processor, causes the electronic device to:
receive an encryption request for a target file;
generate a key for the target file based on the encryption request; and
transmit a key storage request to an external safety device, wherein the key storage request is configured to request the external safety device to store a correspondence between an identifier of the target file and the key,
wherein the external safety device is a wearable device comprising a first operating system and a second operating system, a storage space of the first operating system being independent of a storage space of the second operating system; and
wherein said transmitting the key storage request to the external safety device comprises:
transmitting the key storage request to the first operating system of the wearable device, wherein the key storage request is configured to instruct the first operating system to store the correspondence between the identifier of the target file and the key in the second operating system.

13. The electronic device according to claim 12, wherein the second operating system is a Real-Time Operating System (RTOS).

14. The electronic device according to claim 12, wherein power consumption of the first operating system is greater than power consumption of the second operating system.

15. The electronic device according to claim 12, wherein the computer program, when executed by the processor, further causes the electronic device to, subsequent to said transmitting the key storage request to the external safety device:
receive a decryption request for the target file;
transmit a key retrieval request to the external safety device based on the decryption request, wherein the key retrieval request carries the identifier of the target file and is configured to request the key corresponding to the identifier of the target file from the external safety device; and
receive the key returned by the external safety device, and decrypting the target file based on the key.

16. The electronic device according to claim 12, wherein the external safety device is a smart watch, the first operating system is an Android system and the second operating system is a Real-Time Operating System (RTOS),
wherein said transmitting the key storage request to the external safety device comprises:
transmitting the key storage request to the Android system, the key storage request being forwarded by the Android system to the RTOS.

17. The electronic device according to claim 12, wherein the target file is a picture, a document, an account number and a password of an application, or an unlock password.

* * * * *